Figure 1:
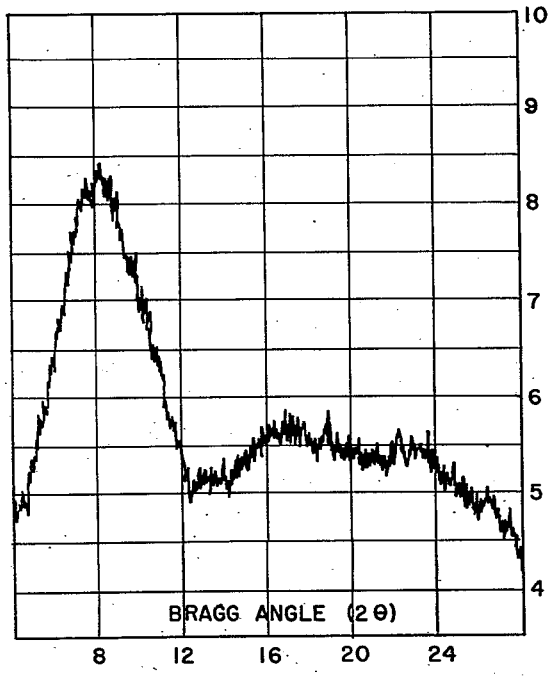

June 11, 1957  M. S. WHELEN  2,795,586
PRODUCTION OF COPPER-PHTHALOCYANINE PRECURSOR
Filed April 15, 1954

INVENTOR
MYRON S. WHELEN
BY David Katz.
ATTORNEY

United States Patent Office 2,795,586
Patented June 11, 1957

2,795,586
PRODUCTION OF COPPER-PHTHALOCYANINE PRECURSOR

Myron S. Whelen, Brandywine Hundred, Del., assignor to E. I. du Pont de Nemours and Company, Wilmington, Del., a corporation of Delaware Application April 15, 1954, Serial No. 423,278

4 Claims. (Cl. 260—314.5)

This invention relates to novel coloring matters of the phthalocyanine series. More particularly, this invention deals with a novel physical form of copper-phthalocyanine precursor, characterized by stability toward atmospheric moisture.

Copper-phthalocyanine precursor may be defined as an alcohol-soluble, macrocyclic complex compound having a composition corresponding to the empirical formula $Cu(C_8H_4N_2)_6NH$, and characterized by yielding copper phthalocyanine upon being treated with reducing agents, the remaining two units of phthalonitrile and the extra NH group being split off in the process in the form of ammonia and phthalonitrile or other phthalic compounds resulting from the interaction of phthalonitrile, ammonia and the reducing medium. This novel compound was first described in copending application of Barnhart and Skiles, Serial No. 252,401 (Patent No. 2,772,284, issued November 27, 1956), wherein it was synthesized by reacting, at a temperature not exceeding 90° C., phthalonitrile, an anhydrous cupric salt and ammonia in an alcoholic solvent containing a catalyst, and recovering the reaction product by diluting the liquid portion of the reaction mass with water.

According to Barnhart and Skiles, the product has the formula

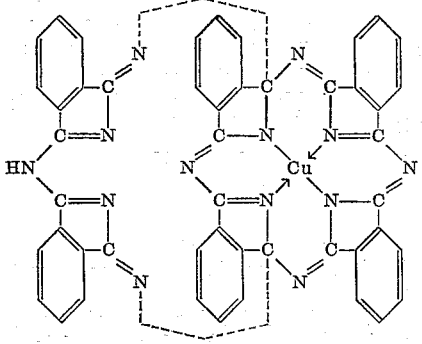

The catalyst indicated in said copending application was a member of the group consisting of urea, biuret, guanidine and methal glucamine.

According to a recent improvement upon said principal method (copending application of A. C. Stevenson, Serial No. 384,349, which issued on November 27, 1956, as Patent No. 2,772,283), air or a mixture of air and ammonia is fed into the reaction mass during the active period of reaction, dimethyl formamide is added to the list of usable solvents, hydrated as well as anhydrous copper salts are employed as sources of copper, and the range of reaction temperature is widened somewhat to include temperatures as low as 55° C. and as high as 98° C. In the application of R. A. Brooks, Serial No. 332,513, now Patent No. 2,772,285, the same compound is prepared by reacting 1,3-diimino-isoindoline with cupric chloride in a convenient solvent, in the absence of catalysts or added ammonia. But in all the procedures heretofore suggested, the reaction product was recovered by drowning the reaction mass in water, filtering and drying.

Now although the above processes give excellent results in the laboratory, the mode of recovery therein employed is not entirely satisfactory in plant scale production. The reaction product hydrolyzes readily when in contact with moisture, especially during the drying operation, and the result is a low quality precursor product, which continues to deteriorate in storage.

I have investigated the above product, and found that the difficulty resides in the fact that the reaction product is amorphous and has a very large surface area. Furthermore, I have found that the mode of recovery may be modified to yield the product in a crystalline form which is of much higher initial quality and considerably more stable to storage.

According to my invention, the reaction product is precipitated by drowning in water and filtered off as in the older processes, but is dried from a non-aqueous medium. To achieve this, the water-wet filter cake is slurried in a low boiling water-miscible alcohol, such as methyl, ethyl or isopropyl, and is then dried at a temperature not exceeding 60° C. In this process the reaction product is transformed into a crystalline form which can be readily distinguished from the aforementioned amorphous form both by its X-ray diffraction pattern and by its appearance under the microscope (both optical and electron).

Figure 2:
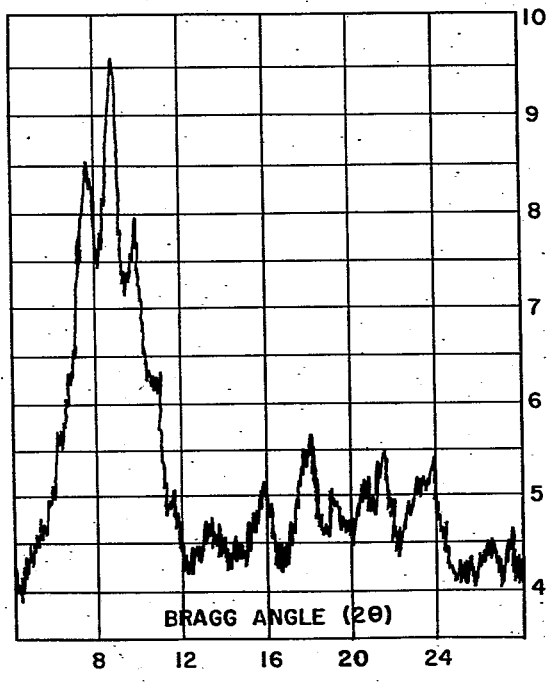

In the accompanying drawing, Fig. 1 is a typical X-ray diffraction pattern of the product produced according to said copending application of Stevenson, while Fig. 2 is a like pattern of the product isolated according to my invention.

In addition to the above, my novel product is distinguished by good storage stability and by higher initial purity due to the avoidance of hydrolytic decomposition during the drying step.

Without limiting my invention, the following examples are given to illustrate my preferred mode of operation. Parts, where mentioned, are by weight.

Example 1

A reaction mass containing copper-phthalocyanine precursor dissolved in dimethyl formamide, and prepared according to Example 3 of Stevenson's copending application Serial No. 384,349 (Patent No. 2,772,283) from 113 parts of phthalonitrile and 28 parts of copper sulfate monohydrate, was filtered hot, and the insoluble impurities were washed with dimethyl formamide. The combined filtrates were then drowned in about 1600-1700 parts of water at 25-35° C. The precipitated precursor was filtered off, and washed with water until free of dimethyl formamide. The cake was sucked as free from water as possible, suspended in an equal weight of methyl alcohol (about 300 parts), and slurried for a period of 1 to 3 hours at 25-35° C. This converted the amorphous form present in the water-wet cake to a highly crystalline form. The latter was isolated by filtration followed by washing with a sufficient amount of methyl alcohol to just displace the mother liquor from the cake (about 200 parts). The cake was then sucked well and dried at 50-60° C. in a vacuum oven. Upon conversion, the product assayed 66% of copper-phthalocyanine. It possessed excellent stability in storage, and produced stronger, redder and brighter dyeings and prints than the copper-phthalocyanine precursors produced according to said copending applications.

Example 2

To 140 parts of dimethyl formamide, 15.0 parts of copper sulfate monohydrate ($CuSO_4.H_2O$) were added, and the suspension was saturated with ammonia gas below 40° C. 64 parts of phthalonitrile and 5 grams of methylglucamine were added and the whole was heated to 70° C. Air was then bubbled through at the rate of 15 liters per gram mole of phthalonitrile per hour while heating to 88° C. over 15 minutes and was continued at this rate for 2 hours while the temperature was maintained at 88–90° C. The reaction mass was clarified by filtration and the filtrate was poured into 2000 parts of cold water. The precursor precipitated and was filtered off. Residual dimethyl formamide and other soluble adherents were removed by washing with water at a temperature not exceeding 60° C. At this stage, the material when viewed on the optical microscope appeared to be completely amorphous in structure.

The water-wet cake was then slurried at room temperature with 200 parts of methyl alcohol for 2 hours. The precursor was filtered off, and washed with 80 parts of methyl alcohol. It was then dried at 50° C. in vacuum. The product was a tan colored crystalline powder, which assayed 65.5% of copper phthalocyanine. A reassay 6 weeks later showed 64.9% copper phthalocyanine. The product showed no signs of turning green and appeared stable.

If instead of methyl alcohol 256 parts of isopropyl alcohol is used for a slurry, followed by washing with 158 parts of isopropyl alcohol in a similar manner, a similar product is obtained having excellent stability properties.

*Example 3*

To 400 grams of dimethyl formamide was added 75 grams of copper sulfate monohydrate ($CuSO_4 \cdot H_2O$) and the mass was saturated with ammonia gas below 40° C. 25 grams of methylglucamine and 320 grams of phthalonitrile were added and the whole was heated to 60° C. Air was then bubbled through the mass at the rate of 37 liters per hour and the mass was heated to 85° C. The temperature was maintained at 85–88° C. for 2 hours while passing in air at the above described rate. The mass was then poured into 2000 grams of water with agitation. After agitating the slurry to disperse the precipitated material, the precursor was filtered off, and washed with water to remove dimethyl formamide and other soluble impurities. The cake was sucked as dry as possible, and was then suspended in an equal weight of methyl alcohol. After agitating for 2 hours, the product was completely crystalline. It was then filtered off, washed with sufficient methyl alcohol to just displace the mother liquor from the cake, pressed tight and dried at 50° C. The product showed excellent stability, and when applied to textiles by printing or dyeing methods it was similar to the material of Example 1.

It will be understood that the details of the above examples may be varied widely within the skill of those engaged in this art. Thus, in lieu of drying under vacuum, drying at ordinary pressure may be applied, provided the temperature of the filter cake is kept from exceeding 60° C.

The quality of the final product will depend, of course, not only on the mode of recovery but also on the conditions of synthesis. For instance, when the quantity of solvent employed is at the minimum for free stirring (about 0.8 to 1.0 part of dimethyl formamide per part of phthalonitrile), the final product may contain as high as 5% of the converted pigment (copper phthalocyanine). However, such a low percentage of pigment is not detrimental, and the product may still be marketed and used.

In lieu of the alcohols named above for slurrying, any other primary or secondary alcohol may be employed provided it is miscible with water in all proportions; is low boiling (say, below 105° C.), to facilitate evaporation thereof; is non-reducing and non-oxidizing, and is of reasonably low cost.

Although maximum economy is obtained when the slurrying treatment is applied directly to the water-wet filter cake obtained after drowning the reaction mass in which the precursor has been synthesized, my novel process may also be used to crystallize, purify and stabilize an amorphous powder obtained by drying the water-wet filter cake.

It is remarkable in this connection that other common solvents tested for the purposes of this invention failed to give the desired results. Nitrobenzene has too high a solvent power for the precursor and does not produce satisfactory crystallization. Benzene on the other hand gives crystals which are too coarse and not suitable for use in textile dyeing and printing processes.

It is preferable to wash the crystalline precursor filter cake when filtered from the water-alcohol slurry with the same alcohol employed in the slurry. This requires the use of an alcohol in which the precursor shows the minimum of solubility. It has been found that methanol is very satisfactory, and as longer chain alcohols are employed the yield on recovery is lessened.

The alcohol to water ratio is dependent on the solubility of the precursor in alcohol. It is desirable to use a ratio in which the precursor is essentially insoluble.

The time of slurrying in the water alcoholic mixture is not too critical. Microscopic examination of the particles shows when the amorphous form is converted to the crystalline form, at which point the conversion is complete and the material should be isolated. Prolonged contact with the crystallizing solvent medium, although not observed as harmful, should preferably be avoided.

If desired, the step of drowning the synthesis mass in water prior to slurrying the precursor in an alcohol may be omitted. In such a case, the synthesis mass, containing the precursor dissolved in dimethyl formamide, is drowned directly in a lower alcohol such as methyl or isopropyl, and the precipitated precursor is filtered off, washed with the same alcohol and dried. Due to solvent losses, the yields by such direct processes are not as high as desirable, but the quality of the material is excellent.

Numerous other variations in details will be readily apparent to those skilled in the art.

I claim:

1. Copper-phthalocyanine precursor in a crystalline form characterized by having a higher stability to moisture than the amorphous form of the same compound, said crystalline form being that which is obtained by slurrying a sample of said amorphous form in a water-miscible alcohol boiling below 105° C., and said precursor being a macrocyclic complex compound which has the constitution $Cu(C_8H_4N_2)_6NH$, wherein the unit $C_8H_4N_2$ represents the atomic configuration

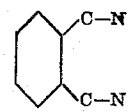

and which yields copper phthalocyanine upon treatment with reducing agents.

2. A process for stabilizing to moisture a copper-phthalocyanine precursor as defined in claim 1, which comprises slurrying an aqueous filter cake of the same, at a temperature not exceeding 60° C., in a water-miscible alcohol boiling below 105° C. and removing the liquid phase at a temperature not exceeding 60° C.

3. A process for stabilizing to moisture a copper-phthalocyanine precursor as defined in claim 1, which comprises slurrying an aqueous filter cake of the same, at a temperature not exceeding 60° C., in a water-miscible alcohol boiling below 105° C., then filtering off the solid precursor and evaporating the alcoholic liquid at a temperature not exceeding 60° C.

4. A process as in claim 3, the water-miscible alcohol being methyl alcohol.

References Cited in the file of this patent

UNITED STATES PATENTS

| | | |
|---|---|---|
| 2,683,643 | Baumann et al. | July 13, 1954 |

FOREIGN PATENTS

| | | |
|---|---|---|
| 879,100 | Germany | July 9, 1953 |
| 698,049 | Great Britain | Oct. 7, 1953 |
| 698,070 | Great Britain | Oct. 7, 1953 |